United States Patent
Li et al.

(10) Patent No.: US 8,396,936 B2
(45) Date of Patent: Mar. 12, 2013

(54) COMPUTER SYSTEM WITH COOPERATIVE CACHE

(75) Inventors: Xiaozhou Li, Cupertino, CA (US); Joseph A. Tucek, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 133 days.

(21) Appl. No.: 12/914,889

(22) Filed: Oct. 28, 2010

(65) Prior Publication Data

US 2012/0110108 A1      May 3, 2012

(51) Int. Cl.
*G06F 15/167* (2006.01)
(52) U.S. Cl. ......... 709/213; 709/214; 709/238; 370/349
(58) Field of Classification Search .................. 709/213, 709/219, 238, 214; 707/999; 370/349
See application file for complete search history.

(56) References Cited

U.S. PATENT DOCUMENTS

| | | | |
|---|---|---|---|
| 6,047,356 A * | 4/2000 | Anderson et al. | 711/129 |
| 7,103,794 B2 * | 9/2006 | Malcolm et al. | 714/4.1 |
| 7,778,987 B2 * | 8/2010 | Hawkins | 707/705 |
| 2002/0133570 A1 * | 9/2002 | Michel | 709/219 |
| 2002/0143984 A1 * | 10/2002 | Hudson Michel | 709/238 |
| 2002/0186679 A1 * | 12/2002 | Nakatsugawa et al. | 370/349 |
| 2004/0111486 A1 * | 6/2004 | Schuh et al. | 709/214 |
| 2004/0162952 A1 * | 8/2004 | Feind et al. | 711/147 |
| 2007/0162462 A1 * | 7/2007 | Zhang et al. | 707/10 |
| 2007/0288695 A1 * | 12/2007 | Artobello et al. | 711/130 |

\* cited by examiner

*Primary Examiner* — Tesfay Yohannes (57) ABSTRACT

A server receives information that identifies which chunks are stored in local caches at client computers and receives a request to evict a chunk from a local cache of a first one of the client computers. The server determines whether the chunk stored at the local cache of the first one of the client computers is globally oldest among the chunks stored in the local caches at the client computers, and authorizes the first one of the client computers to evict the chunk when the chunk is the globally oldest among the chunks stored in the local caches at the client computers.

13 Claims, 5 Drawing Sheets

COMPUTER SYSTEM WITH COOPERATIVE CACHE

BACKGROUND

Cache is memory that temporarily stores frequently accessed data. Once the data is stored in the cache, subsequent accesses cause the data to be retrieved from the cache as opposed to fetching the data from a slower memory location. Caching enables data to be more quickly accessed to lower average access times.

Computer and storage systems can benefit from new uses of caching and fetching data to decrease access times to data.

DETAILED DESCRIPTION

Example implementations are systems, methods, and apparatuses for cooperative caching in a computer or storage system that uses a least recently used (LRU) scheme.

In one embodiment, a collection of small client caches functions as large aggregate cache that mimics a global LRU. The client caches are located at client computers that are networked together and communicate with a directory server. Each client includes a LRU eviction scheme that reports to the directory server before evicting a chunk in its cache. The directory server maintains a timestamp of the chunks in each cache of the client machines. In this way, the directory server stores and keeps track of the locations of each piece of cached data chunk among the clients. For example, the directory server stores a map from chunk identifiers to a list of clients that currently cache the data. The clients inform the directory server about which chunks they cache locally, ask the directory server which other clients, if any, are caching other chunks, and respond to requests for chunks from each other.

In the collection of small caches, multiple copies of a same chunk can exist in multiple caches of client machines. Maintaining multiple copies of the same chunk, however, reduces a total effective space or size of available cache memory for the client machines. Furthermore, when a client cache evicts a chunk, the evicted chunk may not be the oldest chunk in all client caches, and this eviction could violate a global LRU eviction order. Example embodiments maintain a single copy of a chunk throughout the caches of the client machines and ensure that the oldest copy of a chunk is evicted.

When a client desires to evict a chunk from its cache, the client makes a request to the directory server. If the chunk is the oldest among all of the caches in the other clients, then the directory server authorizes the eviction, and the client evicts the chunk. If the chunk is not the oldest among the client caches, then the directory server tells the client which other client has the oldest chunk, and the client forwards the chunk and/or timestamp of the chunk to another client machine and then evicts the chunk.

Figure 1:
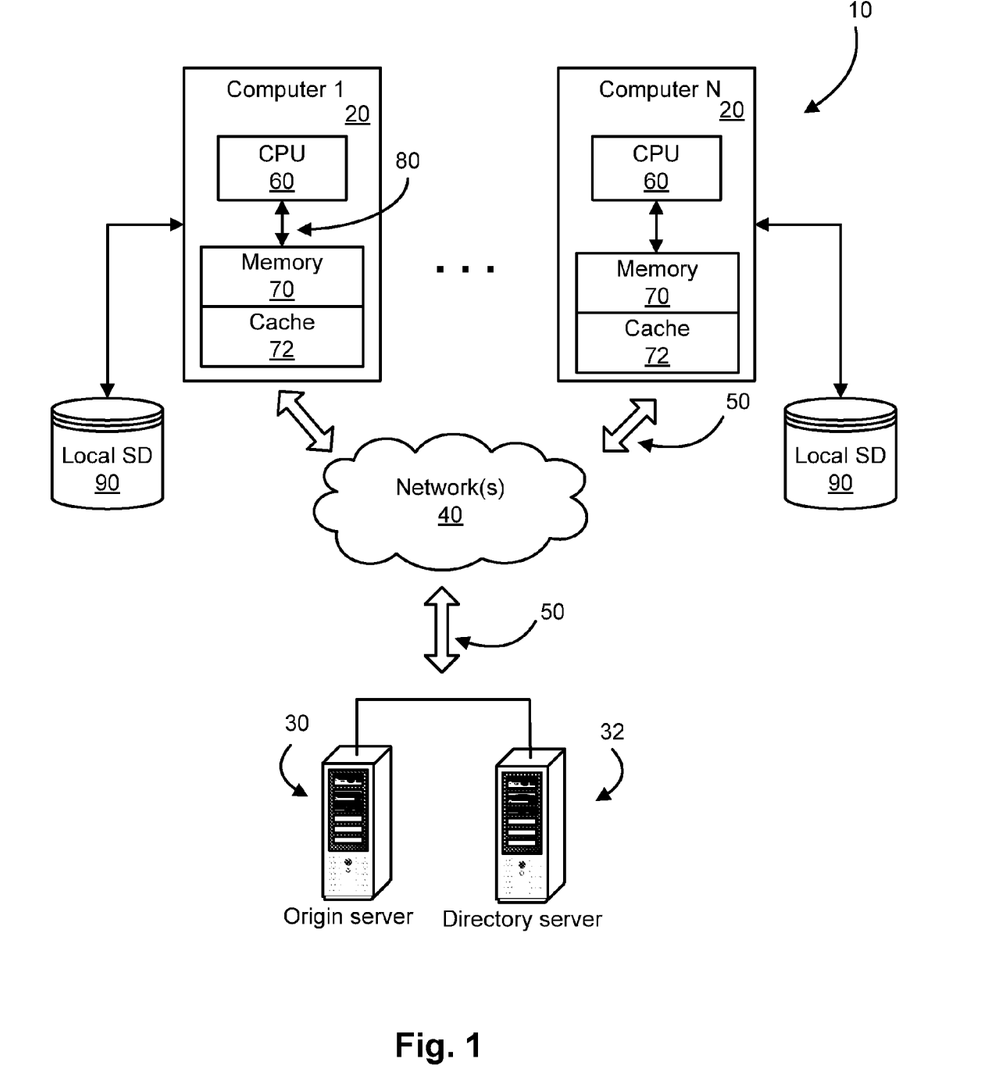
FIG. 1 is a storage or computer system with cooperative caching in accordance with an example implementation.

FIG. 1 shows a storage or computer system 10 with cooperative caching in accordance with an example implementation. The system 10 includes one or more computers 20 (such as clients, host computers, workstations, or peers in a peer-to-peer network, shown as computer 1 through computer N) connected to one or more servers, such as origin server 30 and directory server 32. The computers 20 and servers 30/32 communicate through one or more networks 40 along communication paths 50.

The computers 20 comprise a processing unit 60 (such as one or more processors or central processing units, CPUs) for controlling the overall operation of memory 70 (such as random access memory (RAM) for temporary data storage and local disk for permanent data storage). The memory 70 stores data, applications, daemons, control programs, and other data associate with computers 20 and includes a local cache 72. The processing unit 60 communicates with memory 70 and cache 72 and many other components via buses 80. One or more local storage devices 90 are coupled to each of the computers 20.

Each client computer 20 contributes part of its memory as cache 72 for cooperative caching.

As used herein and in the claims, the term "cache" is memory that improves computer and/or storage performance by transparently storing data such that future requests for that data are served faster. If requested data is contained in the cache (cache hit), this request is served by reading the cache, which is much faster than retrieving the data from storage, such as a hard disk drive or remote storage location. If the data is not contained in the cache (cache miss), the data is fetched from its original storage location, which is comparably slower than retrieving the data from cache memory.

As used herein and in the claims, the term "cooperative cache" is a cache that improves computer and/or storage performance in a parallel or distributed file or computer system by coordinating contents of caches found in multiple computers or nodes (e.g., found in multiple client computers in communication with each other). This coordination between local caches of different computers enables a request from one node or computer to be served by a local cache of a different node or computer (as opposed to the request being served by a slower form of memory, such as a file server).

The directory server 32 stores and keeps track of the locations of the data currently cached in the caches 72 of each client computer 20. By way of example, the data is a chunk, which is a fragment of information. Whenever a cache of one client computer changes (e.g., adding a new chunk or evicting an old chunk), the client informs the directory server 32 of the change.

Local clocks at the client computers 20 are well synchronized with each other. This synchronization occurs with one or more time synchronization protocols, such as Network Time Protocol (NTP) or Precision Time Protocol. In one example embodiment, synchronization within a millisecond is sufficient since a global eviction happens only on a cache miss, which incurs a retrieval from the origin server, which can take tens of milliseconds.

In one example embodiment a large number of clients 20 (e.g., hundreds to thousands of client workstations) are connected by a high speed (Gigabit) Ethernet. Each client has a nontrivial amount of main memory on the order of many MBs or more that can be used as part of the cooperative cache. Clients access data from one or more file servers called origin servers (shown in FIG. 1 as origin server 30). File servers can be slow either because of excessive load, or because they are remotely accessed. To ameliorate this slowness, example embodiments reduce the frequency that clients have to access data from the origin server 30 since the requested data may be located in a local cache of a client. Thus, instead of retrieving the data from the origin server, a client first requests the data from the cache of another client. If the data is located in a cache of another client, then the data is retrieved and provided to the requesting client in a more expeditious manner than the client retrieving the data from the origin server. Alternatively, the client can make parallel requests for the data (e.g., simultaneously request the data from a local cache of another client and request the data from a remote location, such as a file server).

Figure 2A:
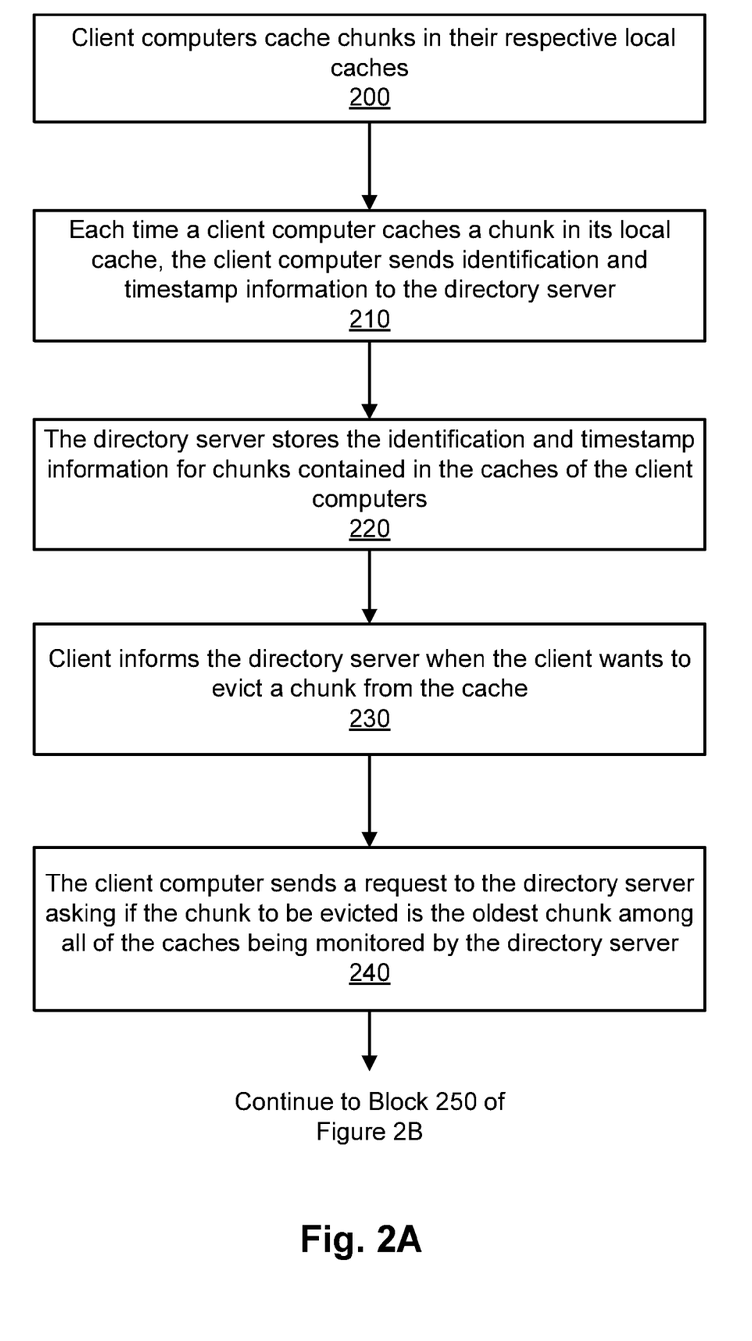
FIG. 2A is a flow chart for cooperative caching according to an example implementation.
Figure 2B:
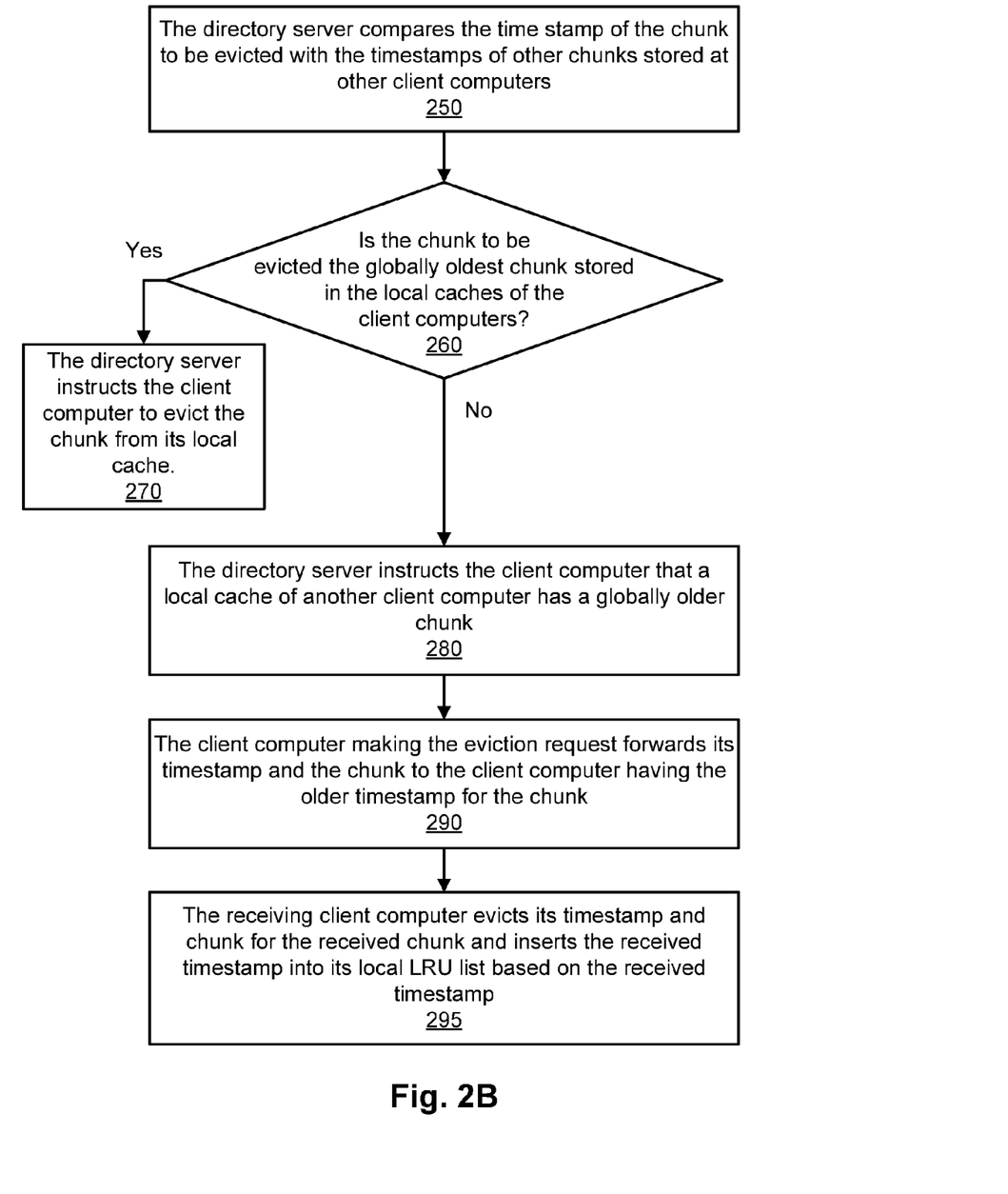
FIG. 2B is a continuation of FIG. 2A of the flow chart for cooperative caching according to an example implementation.

FIGS. 2A and 2B show a flow chart for cooperative caching according to an example implementation.

According to block 200, the client computers cache chunks in their respective local caches.

According to block 210, each time a client computer caches a chunk in its local cache, the client computer sends identification and timestamp information to the directory server.

According to block 220, the directory server stores the identification and timestamp information for the chunks contained in the caches of the client computers. In one example embodiment, the directory server uses a min heap to keep track of the timestamps for the oldest chunks received from the client computers.

The following example illustrates an example embodiment of the data structure at the directory server. Consider two clients A and B. Client A has four local chunks (a1: 10; a2: 20, a3: 30, and a4: 40), where a1-a4 are the chunks and 10-40 are timestamps for each chunk. Client B has four local chunks (b1: 5; b2: 15, b3: 25, and b4: 35), where b1-b4 are the chunks and 5-35 are timestamps for each chunk. There are two data structures. One data structure is a map that maps chunk—ids to client—ids. In this particular example, the mapping is: a1→A, a2→A, a3→A, a4→A, b1→B, b2→B, b3→B, and b4→B. This map need not keep the timestamps. The other data structure is a min heap that contains the oldest timestamps from each client. In this particular example, the min heap has two items: A→10 and B→5. In other words, the min heap contains a much smaller number of items than the map. The number of items in the min heap equals the number of clients. The number of items in the map equals (number of clients)×(number of chunks per client).

According to block 230, the client informs the directory server when the client wants to evict a chunk from its cache.

In block 240, the client computer sends a request to the directory server asking if the data chunk to be evicted is the oldest chunk among the caches being monitored by the directory server. In other words, the client sends a request asking if the chunk to be evicted is the oldest global chunk in the cooperative cache.

According to block 250, the directory server compares the timestamp of the chunk to be evicted with the timestamps of other chunks stored at other client computers.

According to block 260, a determination is made as to whether the chunk to be evicted is the globally oldest chunk stored in the local caches of the client computers. One example embodiment uses a LRU scheme.

If the answer to this determination is "yes" (i.e., the chunk to be evicted is the oldest), then flow proceeds to block 270. According to block 270, the directory server instructs the client computer to evict the chunk from its local cache.

If the answer to this determination is "no" (i.e., the chunk to be evicted is not the oldest), then flow proceeds to block 280. According to block 280, the directory server instructs the client computer that a local cache of another client computer has a globally oldest chunk. The directory server provides an identification of the chunk and the client computer having this oldest chunk to the client computer making the eviction request.

According to block 290, the client computer making the eviction request forwards its timestamp and chunk to the client computer having the oldest timestamp for the chunk.

According to block 295, when the receiving client computer receives the chunk from the sending client computer, the receiving client computer evicts its local oldest chunk and inserts the received chunk into its local LRU list based on the received timestamp. Thus, the oldest local chunk is deleted at the receiving client computer, and the chunk received from the sending client computer is inserted into the local cache of the receiving client computer.

One example embodiment implements a G-LRU (Global-LRU) algorithm as follows. Suppose client A is about to evict chunk X from its local cache. Client A asks the directory server whether chunk X is the oldest chunk of chunks being stored among the local caches of other clients in the cooperative cache. In order to answer such inquiries, the directory server keeps track of the timestamps of the oldest chunk of each client, and each client updates the directory server if its local oldest chunk's timestamp changes. The directory server either replies "yes, chunk X is the global oldest chunk" or "no, chunk Y at client B is the globally oldest chunk". When the answer is "yes" and client A receives this reply, client A evicts chunk X and updates the directory server about client A's next oldest chunk's timestamp. When the answer is "no" and client A receives this reply, client A forwards the chunk and timestamp for chunk X to client B. When client B receives chunk X, client B evicts chunk Y (its local oldest chunk), and inserts chunk X into its local LRU list based on the timestamp of chunk X. Since both client A and client B evict a chunk from their local caches, they update the directory server about the timestamps of their current oldest data chunk. In one example embodiment, a skip list is used to achieve logarithmic running time in order to insert chunk X into the local LRU list of client B. Other ordered data structures could also be used (e.g. red-black trees).

If between the time client A is told that client B holds the oldest chunk and the time client B receives the chunk X, client B accesses chunk Y (so chunk Y is no longer the globally oldest chunk), then client B instead inserts chunk X into its local LRU list based on timestamp of chunk X. Client B then proceeds with evicting its oldest chunk Z (which may be a previously unmentioned chunk or it may be the same as chunk X).

At this point, client B has some options on how to handle the eviction of chunk Z. One option is to discard chunk Z and update the directory server about the new oldest chunk of client B and the associated timestamp. Another option is to follow the procedure discussed above per block 210 (i.e., forward the timestamp of chunk Z to the directory server). To shortcut repeated recursion into block 210 (i.e., to reduce this ripple effect), the directory server can, in block 230, list the oldest chunks and associated timestamps at several clients rather than just the client with the globally oldest chunk.

The following example illustrates an example embodiment. Consider two clients A and B. Client A has four local chunks and timestamps (a1: 10; a2: 20, a3: 30, and a4: 40), and client B has four local chunks and timestamps (b1: 5; b2: 15, b3: 25, and b4: 35). Suppose client A desires a new chunk x at time 50. Client A asks the directory server "who has chunk x?" The directory server replies "nobody." So client A obtains chunk x from the origin server, and since the local cache of client A is full, client A evicts the oldest chunk (a1: 10) in order to make room for the new chunk (x: 50). Client A asks the directory server "Is a1 the oldest chunk among the clients?" The directory server replies "No, client B has the oldest chunk." Client A then sends a1: 10 (including the chunk and the timestamp) to client B. Upon receiving a1: 10, client B deletes its local oldest chunk b1: 5, and inserts a1: 10 into its local cache. Therefore, after this forwarding, the local cache of client A is a2: 20, a3: 30, a4: 40, and x: 50. The local cache of client B is a1: 10; b2: 15, b3: 25, and b4: 35.

The blocks according to FIGS. 2A and 2B enforce a global LRU eviction order. Example embodiments also prevent multiple copies of the same chunk from existing in more than one of the client caches. One example method is as follows: Multiple copies occur, for example, when client A obtains a chunk X from client B. To prevent chunk X from being cached at both client A and client B, when client A asks for chunk X from client B, client A also sends chunk Y, client A's local oldest chunk, and the timestamp of chunk Y to client B. Effectively, client A and client B are swapping chunk X and chunk Y. Upon receiving chunk Y, client B inserts chunk Y into its local LRU list based on the timestamp for chunk Y.

The G-LRU algorithm mimics a global aggregate LRU cache which is effective in reducing the load on the origin file server. In one example embodiment, the directory server stores or keeps a heap of timestamps of size N, where N is the number of clients. In one embodiment, N is on the range of hundreds to thousands, which produces a relatively small overhead in memory space. The clients update the directory server when their local oldest chunk's timestamp changes. Such an update occurs when (1) an oldest chunk is evicted or forwarded, or (2) a locally oldest chunk is accessed locally again. Neither are frequent events. The directory server will receive such messages, but not a relative large number of such messages, hence keeping an overhead in transmission relatively low.

In one example embodiment, the clients store or keep a timestamp for each chunk it caches. For example, the client maintains a skip list in order to insert a chunk in the middle of an LRU list. A skip list is a data structure that stores sorted list items. Skip lists use a hierarchy of linked lists that connect increasingly sparse subsequences of the items. These lists enable a chunk to be quickly found. Thus, skip lists are space and time efficient data structures.

With example embodiments, each client contributes a part of its local cache memory for global cooperative caching. The centralized directory server tracks the locations of data chunks currently cached in each of the client caches. Whenever the cache of a client changes (e.g., adding a new chunk or evicting an old chunk), the client informs the directory server of the change. Local clocks at the clients are well synchronized with each other (e.g., synchronization within a millisecond is sufficient since a global eviction happens only on a cache miss, which incurs a disk IO of roughly 10 milliseconds).

For every data chunk that is cached, the client keeps the latest access timestamp for that chunk. Each client executes an LRU algorithm or policy on its local cache to evict data chunks from the cache.

As used herein and in the claims, "Least Recently Used" or "LRU" is an algorithm that discards first from cache least recently used data. In example embodiments, the LRU algorithm includes timestamps that are used to compare the age of chunks across different client computers.

Figure 3:
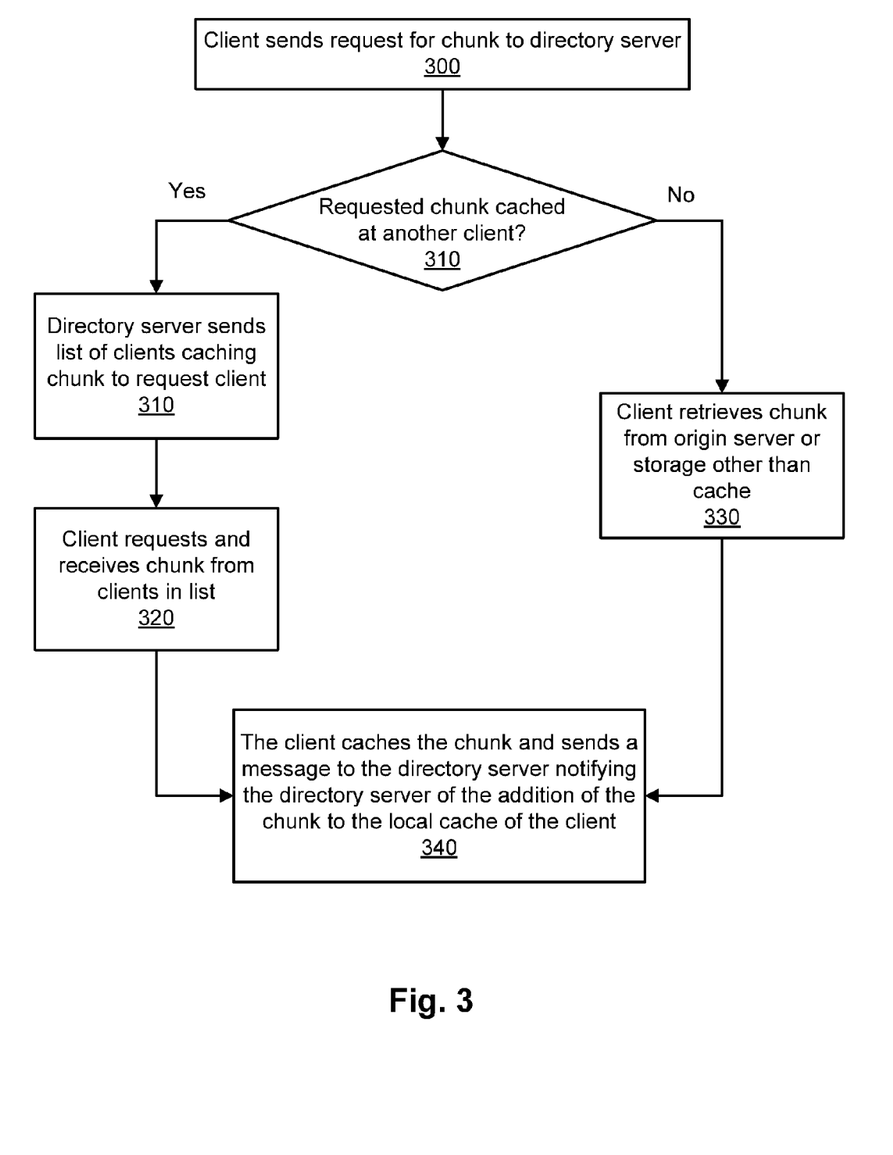
FIG. 3 is a flow diagram of a client requesting and retrieving a chunk in accordance with an example implementation.

FIG. 3 is a flow diagram for a client requesting and retrieving a chunk according to an example implementation.

According to block 300, a client sends a request for a chunk to the directory server.

According to block 310, a determination is made as to whether the requested chunk is located in a local cache (i.e., part of the cooperative cache) of another client. This determination is made by the directory server which keeps track of which client computer caches what chunks.

According to block 320, if the answer to the determination is "yes" then the directory server sends a list of clients caching the requested chunk to the requesting client.

According to block 330, the client requests and receives the chunk from one or more of the clients in the list received from the directory server (assuming the chunk is still cached in one of the other clients).

According to block 330, if the answer to the determination is "no" then the client retrieves the chunk from an origin server or storage location other than a cache (i.e., other than the cooperative cache).

According to block 340, the client caches the chunk and sends a message to the directory server notifying the directory server of the addition of the chunk to the local cache of the client.

The following example illustrates an example embodiment. Consider two clients A and B. Client A has four local chunks and timestamps (a1: 10; a2: 20, a3: 30, and a4: 40), and client B has four local chunks and timestamps (b1: 5; b2: 15, b3: 25, and b4: 35). Suppose client A wants chunk b3 at time 50. Client A asks the directory server "Who has b3?" and the directory server replies "Client B has b3." Client A then sends a message to client B: "I desire b3, and you can take a1: 10." Upon receiving this message, client B sends client A chunk b3, and client B deletes b3: 25 from its local cache and inserts a1: 10 in its local cache. Thus, the local cache of client B becomes b1: 5; a1: 10, b3: 15, and b4: 35. Upon receiving the message of client B, client A puts b3: 50 in its local cache and deletes a1: 10. The local cache of client A becomes a2: 20, a4: 40, and b3: 50.

Figure 4:
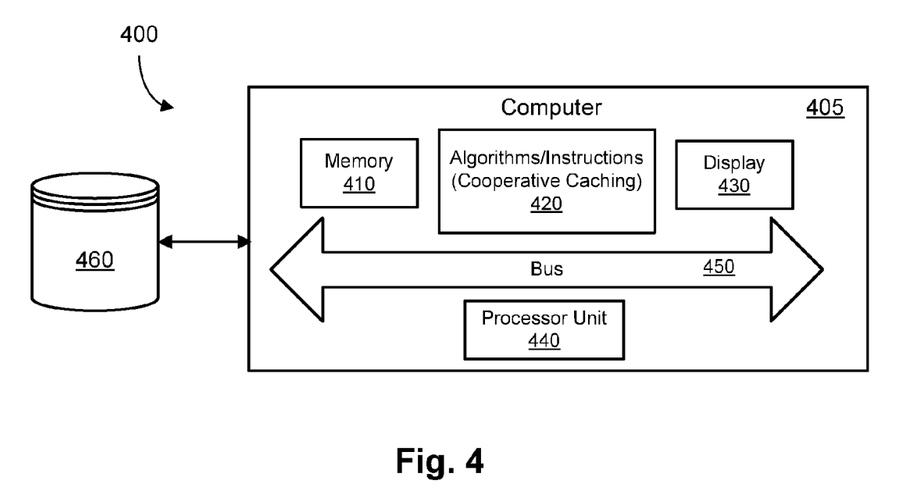
FIG. 4 is a computer system in accordance with an example implementation.

FIG. 4 is a block diagram of a computer system 400 in accordance with an exemplary embodiment of the present invention. In one embodiment, the computer system includes one or more storage devices 460 and a computer or server 405 (such as a directory server). The computer 405 memory 410, algorithms and/or computer instructions 420 (such as a cooperative caching algorithm or G-LRU algorithm discussed herein), display 430, processing unit 440, and one or more buses 450.

In one embodiment, the processor unit includes a processor (such as a central processing unit, CPU, microprocessor, application-specific integrated circuit (ASIC), etc.) for controlling the overall operation of memory 410 (such as random access memory (RAM) for temporary data storage, read only memory (ROM) for permanent data storage, and firmware) and algorithms/instructions 420. The processing unit 440 communicates with memory 410 and algorithms 420 via one or more buses 450 and performs operations and tasks necessary for constructing models and searching the database per a query. The memory 410, for example, stores applications, data, programs, algorithms (including software to implement or assist in implementing embodiments in accordance with the present invention) and other data.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as one or more non-transitory computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Example embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles of various example embodiments. Numerous variations and modifications will become apparent to those skilled in the art once the above disclosure is fully appreciated.

It is intended that the following claims be interpreted to embrace all such variations and modifications.

What is claimed is:

1. A method executed by a computer system, comprising:
   receiving, at a server and from client computers, information that identifies which chunks are stored in local caches at the client computers;
   receiving, at the server and from a first one of the client computers, a request to evict a chunk from a local cache of the first one of the client computers;
   determining, by the server, whether the chunk stored at the local cache of the first one of the client computers is a globally oldest chunk, wherein the globally oldest chunk is older than all of the chunks stored in the local caches at the client computers;
   authorizing, by the server, the first one of the client computers to evict the chunk when the chunk is the globally oldest chunk; and
   instructing the first one of the client computers, when no other client computer has the chunk requested, to send a timestamp of the chunk and the chunk to another client computer when the another client computer has a chunk with the oldest timestamp among the chunks stored in the local caches at the client computers.

2. The method of claim 1 further comprising:
   receiving, at the server and from a client computer, a request for a location of a specific chunk;
   instructing, from the server to the client computer, a name of the another client computer storing the specific chunk;
   sending, from the client computer to the another client computer, a timestamp and data of a local oldest chunk cached at the client computer; and
   deleting, by the client computer, the specific chunk from cache memory.

3. The method of claim 1 further comprising:
   receiving, at the another client computer, the chunk from the first one of the client computers;
   deleting a local oldest chunk from a cache at the another client computer; and
   inserting into the cache the chunk received from the first one of the client computers, the chunk being inserted into a local LRU list based on the timestamp of the chunk.

4. The method of claim 1 further comprising:
   sending, from a client computer to the another client computer, a timestamp and data of a local oldest chunk stored in cache at the client computer;
   deleting, by the client computer, the local oldest chunk from the cache; and
   inserting, into a local cache of the another client computer, the local oldest chunk according to the timestamp of the local oldest chunk.

5. A non-transitory computer readable storage medium storing instructions that, when executed by a computer system, cause the computer system to:
   form a cooperative cache among client computers that utilize a least recently used (LRU) eviction scheme at local caches of the client computers;
   instruct a server of which chunks are stored in the local caches of the client computers;
   send a chunk and timestamp of the chunk being evicted from a local cache of one client computer to another client computer that belong to the cooperative cache;
   insert the chunk received from the one client computer into the another client computer when the another client computer has a chunk with a globally oldest timestamp among the chunks stored in the local caches at the client computers, the chunk being inserted in the cache based on a timestamp of the chunk received from the one client computer; and execute a global LRU eviction order that ensures that multiple copies of a same chunk do not exist at the local caches of the client computers and that an oldest copy of a chunk is evicted first among the local caches of the client computers.

6. The non-transitory computer readable storage medium of claim 5 wherein the computer further executes the instructions to:

synchronize local clocks at the client computers and send, from the client computers to the server, identification and timestamp information for chunks contained in the local caches of the client computers.

7. The non-transitory computer readable storage medium of claim 5, wherein the computer further executes the instructions to:

process, at the server, a request from the one client computer to determine whether the chunk being evicted from the local cache of the one client computer is oldest among the chunks stored in the local caches of the client computers.

8. The non-transitory computer readable storage medium of claim 5, wherein the computer further executes the instructions to:

provide, from the server to the one client computer, an identification of a client computer storing a chunk with the globally oldest timestamp among the client computers.

9. A computer system, comprising:

client computers that share chunks stored in local caches to form a cooperative cache;

a server that receives an eviction request from a client computer in the cooperative cache to evict a chunk from local cache and that instructs the client computer that a local cache of another client computer in the cooperative cache has a globally oldest chunk and an associated timestamp that is a globally oldest timestamp among the chunks stored in the local caches at the client computers; and the another client computer that replaces a timestamp that is associated with the globally oldest chunk with the timestamp that is associated with the chunk that is being evicted and the globally oldest chunk with the chunk that is being evicted.

10. The computer system of claim 9, wherein the server uses a min heap to keep track of timestamps of oldest chunks in the client computers.

11. The computer system of claim 9, wherein the server further provides the client computer a client computer storing a chunk with the globally oldest timestamp among the client computers.

12. The computer system of claim 9, wherein the client computer forwards the timestamp of the chunk and chunk being evicted from the client computer to the another client computer having the globally oldest chunk.

13. The computer system of claim 9, wherein the another client computer evicts the timestamp of the globally oldest chunk and inserts the timestamp of the chunk being evicted from the client computer into a local least recently used (LRU) list.

* * * * *

UNITED STATES PATENT AND TRADEMARK OFFICE
CERTIFICATE OF CORRECTION

PATENT NO. : 8,396,936 B2
APPLICATION NO. : 12/914889
DATED : March 12, 2013
INVENTOR(S) : Xiaozhou Li et al.

Page 1 of 1

It is certified that error appears in the above-identified patent and that said Letters Patent is hereby corrected as shown below:

In the Claims:

In column 9, line 13, in Claim 6, delete "and" and insert -- at reasonable accuracy; and --, therefor.

Signed and Sealed this
Third Day of September, 2013

Teresa Stanek Rea
*Acting Director of the United States Patent and Trademark Office*